(12) United States Patent
Robertson et al.

(10) Patent No.: US 7,737,979 B2
(45) Date of Patent: Jun. 15, 2010

(54) ANIMATED TRANSITIONS FOR DATA VISUALIZATION

(75) Inventors: George G. Robertson, Seattle, WA (US); Roland L. Fernandez, Woodinville, WA (US); Morten Holm-Petersen, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/674,115

(22) Filed: Feb. 12, 2007

(65) Prior Publication Data

US 2008/0192056 A1   Aug. 14, 2008

(51) Int. Cl.
*G06T 15/00* (2006.01)
(52) U.S. Cl. .................. 345/473; 345/440; 715/203; 715/723
(58) Field of Classification Search ............. 345/473, 345/440; 715/203, 723
See application file for complete search history.

(56) References Cited

U.S. PATENT DOCUMENTS

| | | | |
|---|---|---|---|
| 5,353,391 A * | 10/1994 | Cohen et al. ............. | 345/619 |
| 5,359,712 A * | 10/1994 | Cohen et al. ............. | 715/723 |
| 6,256,649 B1 | 7/2001 | Mackinlay et al. | |
| 6,462,742 B1 | 10/2002 | Rose et al. | |
| 6,995,768 B2 | 2/2006 | Jou et al. | |
| 7,148,895 B2 | 12/2006 | Konishi et al. | |
| 2004/0174397 A1 | 9/2004 | Cereghini et al. | |
| 2004/0207665 A1 | 10/2004 | Mathur | |
| 2005/0131930 A1 | 6/2005 | Jang et al. | |

OTHER PUBLICATIONS

Advantages of using PowerCharts, available at http://www.fusioncharts.com/PCDocs/Index.html.
Animate chart elements in Microsoft Office PowerPoint, Mar. 6, 2007, available at http://www.microsoft.com/Education/Animate.mspx.
Demetrescu, C., I. Finocchi, A data-driven graphical toolkit for software visualization, Proc. of the 2006 ACM Symposium on Software Visualization, 2006, pp. 57-66, ACM, New York, NY, USA.

* cited by examiner

*Primary Examiner*—Phu Nguyen
(74) *Attorney, Agent, or Firm*—Lyon & Harr, LLP; Mark A. Watson

(57) ABSTRACT

A "Charting Animator" enhances computer-based charting/graphing systems by rendering dynamic animations of chart displays. In general, when a user changes from one chart type to another, adds new data to a chart, or changes, sorts or deletes data, a new chart is generated to replace the old chart. Conventional charting systems simply replace the existing chart with the new chart. In contrast to conventional systems, the Charting Animator renders animated transitions that dynamically morph the original chart into the new chart. Consequently, these animations avoid abrupt changes that can disorient users. Examples of these animations include animating changes from one chart family to another (e.g., changing from a "Bar Chart" to a "Pie Chart"), animating changes from one chart type within a chart family to another chart type (e.g., changing 2D Bar Charts to 3D Bar Charts or Stacked Bar Charts), animating data changes, animating sorts, etc.

20 Claims, 3 Drawing Sheets

ANIMATED TRANSITIONS FOR DATA VISUALIZATION

BACKGROUND

1. Technical Field

The invention is related to computer-based data charting and graphing, and in particular, to a system for automatically animating transitions when changing from one chart or graph type to another and/or when changing data values associated with those charts and graphs.

2. Related Art

Computer-based charting and graphing software tools are well known to those skilled in the art. Such software tools are often used to generate data displays such as, for example, pie charts, bar charts, data graphs, etc. Conventionally, these types of software tools allow a user to select or enter one or more data sets, and then select a chart type for rendering a chart or graph display of that data. Then, whenever a user changes from one chart type to another, or whenever data is added or changed, a new chart is rendered and the original chart is simply replaced by the newly rendered chart.

One of the problems with simply replacing one chart with another is that the user doesn't really get a sense of how the data has changed, especially if those changes are subtle or if they involve multiple data elements (such as changes to several related bars in a bar chart). Further, since one chart simply replaces another (at computer display rendering speeds), the change is essentially immediate. Unfortunately, this type of abrupt change is often disorienting to users.

Another feature of conventional charting and graphing software tools is that data is entered, and then the corresponding charts and/or graphs are rendered as a function of the data. Changes to those charts and graphs are accomplished by editing or otherwise changing the underlying data, at which point these conventional software tools will render a new chart or graph corresponding to the newly edited data. Unfortunately, this feature is typically one-way. In other words, charts and graphs are changed by direct manipulation of the underlying data, while the underlying data is not changed by direct manipulation of the corresponding chart or graph.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Charting Animator" enhances computer-based charting/graphing systems by rendering dynamic animations of chart displays. In general, when a user changes from one chart type to another, when new data is added to a chart, or when existing data is changed, sorted or deleted, a new chart appears to replace the old chart. Conventional charting systems simply replace the existing chart with a new chart. However, unlike conventional charting systems, the Charting Animator renders an animated transition for dynamically morphing the original chart into the new chart.

Consequently, the animation provided by the Charting Animator avoids abrupt changes that can be disorienting to users. Examples of the animations provided by the Charting Animator include animating changes from one chart family to another (e.g., changing a "Bar Chart" into a "Pie Chart", etc.), changes from one chart type within a chart family to another chart type (e.g., changing from a "2D Bar Chart" into a "3D Bar Chart" or a "Stacked Bar Chart", etc.), changes to data, etc. In general, these animations are timed to occur over a relatively short period of time that allows the user to visually perceive changes to displayed charts while being sufficiently short in time so that users do not perceive that they are waiting for the system. However, any desired animation length, including varying length for different types animations are enabled by the Charting Animator.

Further, in various embodiments, elements of the displayed charts are user selectable and provide direct interactive feedback with the underlying data. For example, in various embodiments, the Charting Animator provides the capability to directly manipulate elements of charts, such as, for example, the height of one or more bars in a bar chart, the size of a slice in a pie chart, individual peaks or points in a line chart, etc. Other direct manipulation includes moving chart elements from one location to another, including stacking or combining elements of the chart. For example, stacking one bar on top of another in a bar chart will serve to combine those bars into a single element, thereby combining the underlying data into a single data set. In related embodiments, the Charting Animator allows combined elements or data sets to be separated back out at a later time, if desired.

Similarly, the Charting Animator provides the capability to directly add or delete elements from a chart, thereby creating, or deleting, an underlying data set. For example, inserting a new rectangular bar in a Bar Chart will create a corresponding data set for the new bar element, while deleting a pie slice from a pie chart will delete the underlying data set and expand the relative sizes of the remaining slice elements of the Pie Chart.

In either case, a change to any chart elements via direct manipulation, insertion, or deletion causes the Charting Animator to immediately modify the underlying data, as well as any interrelated data or chart elements. Further, in various embodiments, the Charting Animator combines animation embodiments with direct manipulation embodiments. For example, in one combination embodiment, as the user manipulates one graphical element of a chart, such as, for example, the height of a bar in a bar chart, the underlying data set will change in correspondence to the graphical change. Simultaneously, any related data sets that are dependent upon the underlying data being changed by manipulation of the graphical element will also be automatically changed, with corresponding animations being simultaneously rendered for the corresponding graphical elements of the chart.

Finally, in yet another embodiment, the Charting Animator provides the capability to construct "composite charts" as a composition of one or more existing charts. As a result, two or more relatively simple charts can be combined to compose a more complex composite chart. Further, the Charting Animator described herein provides the capability to predefine composite chart types for user selection. A simple example of a composite chart enabled by the Charting Animator is termed a "Quantity Flow Diagram."

An example of a Quantity Flow Diagram is a composite data set that includes dates and amounts of incoming quantities and dates and amounts of outgoing quantities, such as, for example, cash flow and material (inventory) availability. Given this example data set, the Charting Animator constructs the Quantity Flow Diagram as a composite chart that shows incoming quantities in a first Bar Chart (positive bars trending up from a common axis), a second Bar Chart below the first that shows the outgoing quantities (negative bars trending down from the common axis), and a Plateau Chart below the first and second Bar Charts showing the quantity flow (the difference of the two quantities over time). Further, all of the elements of this three part composite chart are interrelated. Therefore, in one embodiment, changes made to any one element of the composite chart (or to the underlying data) will be immediately reflected in all related underlying data, as described above, with those changes also being rendered as an animation to any corresponding chart elements.

In view of the above summary, it is clear that the Charting Animator described herein provides a unique system and method for rendering dynamic animations of chart displays and for manipulating the underlying data of those chart displays. In addition to the just described benefits, other advantages of the Charting Animator will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
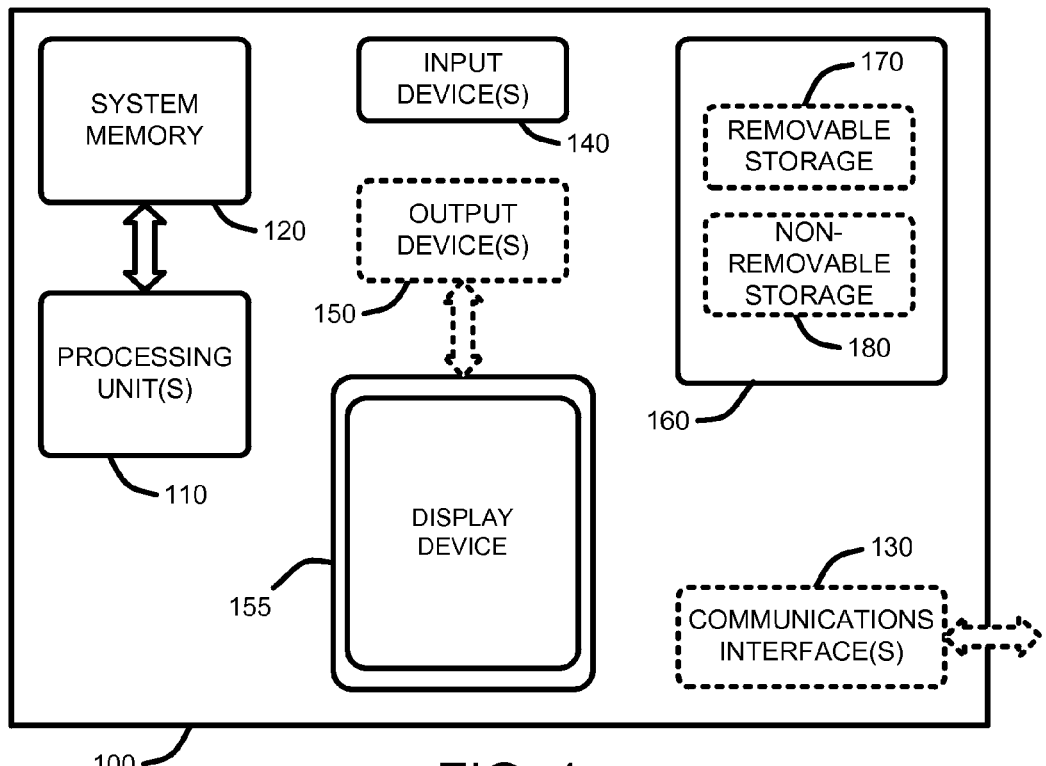
FIG. 1 is a general system diagram depicting a general-purpose computing device constituting an exemplary system for implementing various elements of a Charting Animator, as described herein.

1.0 Exemplary Operating Environment:

FIG. 1 illustrates an example of a simplified computing environment on which various embodiments and elements of a "Charting Animator," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document.

At a minimum, to enable a computing device to implement the "Charting Animator" (as described in further detail below), the computing device must have at least some minimum computational capability, a display device, an input device, and some local or remote data storage and access capability.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

In fact, the invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones, PDA's, pocket PC's or media players, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer or a computing device in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, one or more communications interfaces 130, one or more input and/or output devices, 140 and 150, respectively, and data storage 160 that is removable and/or non-removable, 170 and 180, respectively. In addition, the computing system 100 may access data remotely via the communications interface 130.

The communications interface 130 is generally used for connecting the computing device 100 to other devices via any conventional interface or bus structure, such as, for example, an Ethernet port, a parallel port, a game port, a universal serial bus (USB), an IEEE 1394 interface, a Bluetooth™ wireless interface, an IEEE 802.11 wireless interface, GSM cell phone network, etc. Such interfaces 130 are generally used to transfer information, data, or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, GPS receiver, radio receiver, and a television or broadcast video receiver, or the like. Conventional output devices 150 include elements such as a computer monitors or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying the "Charting Animator."

2.0 Introduction:

A "Charting Animator," as described herein, enhances computer-based charting/graphing systems by rendering dynamic animations of chart displays. In various embodiments, the Charting Animator provides animated chart transitions in response to various user actions (e.g., changing from one chart type to another, adding new data to a chart, changing, sorting or deleting data, modifying one or more chart elements via selection and manipulation of those elements, etc.). The result of the animated transition is to provide an animation that replaces the original chart by dynamically morphing the original chart into the new chart. Consequently, these animations avoid abrupt changes that can disorient users. Examples of these animations include animating changes from one chart family to another (e.g., changing from a "Bar Chart" to a "Pie Chart"), animating changes from one chart type within a chart family to another chart type (e.g., changing a Bar Chart to a 3D Bar Chart or a Stacked Bar Chart), animating changes to data, etc.

Note that the concept of "chart types" and "chart families" is well known to those skilled in the art. In general, a chart family includes one or more chart types. For example, conventional "2D Bar Charts," "3D Bar Charts," and "Stacked Bar Charts" are members (chart types) of the more generic "Bar Chart" family. Examples of distinct chart families include "Bar Charts," "Pie Charts," "Area Charts," "Line Charts," etc. One of the advantages of the animated transitions provided by the Charting Animator is that these transitions provide the user with a visual indication of what changes are occurring when changing from one chart type to another (e.g., animating a transition from a 2D Bar Chart to a 3D Bar Chart), or from one chart family to another (e.g., animating a transition from a 3D Bar Chart to a Pie Chart).

2.1 General Overview:

As noted above, the Charting Animator described herein provides a computer-based charting/graphing system for rendering dynamic animations of chart displays, including, for example, Bar Charts, Pie Charts, Area Charts, Line Charts, etc. In general, these dynamic animations operate to dynamically morph an original chart into a new chart to reflect changes either to the underlying data values defining elements of the original chart or to graphical elements of the original chart via user interaction with those elements via a graphical user interface.

For example, when a user changes from one "chart type" or "chart family" to another, when new data is added to a chart, or when existing data is changed, sorted or deleted, a new chart appears to replace the old chart. However, in contrast to conventional charting systems, the Charting Animator dynamically morphs one or more elements of the original chart into one or more elements in the new chart to provide an animated transition that smoothly changes the original chart into the new chart.

In additional embodiments, the Charting Animator provides the capability for user selection and manipulation of one or more of the graphical elements of charts. This user selection and manipulation capability is combined with automatic interactive feedback with the underlying data. For example, if the user resizes the height of one or more bars in a Bar Chart (using conventional drag and drop type computer operations) the Charting Animator will automatically amend the underlying data to correspond to the new height of the resized bar elements of that Bar Chart.

Similarly, in a related embodiment, the Charting Animator provides the capability to directly add or delete elements from a chart, thereby creating, or deleting, an underlying data set. For example, inserting a new bar element in a Bar Chart will automatically cause the Charting Animator to create a corresponding data set for the new bar element. Similarly, deleting a pie slice from a Pie Chart will delete the underlying data set and cause the Charting Animator to expand the relative sizes of the remaining pie slice elements of the pie chart, with the expansion of the pie slice elements being animated, as described in further detail below in Section 3.

Finally, in yet another embodiment, the Charting Animator provides the capability to construct "composite charts" by combining one or more existing charts. In particular, these composite charts represent a combination of two or more charts that are combined to compose a more complex composite chart. In one embodiment, both the underlying charts and the composite charts are displayed together to provide the user with a better understanding of how the data of the underlying charts relates to the composite chart.

Figure 2:
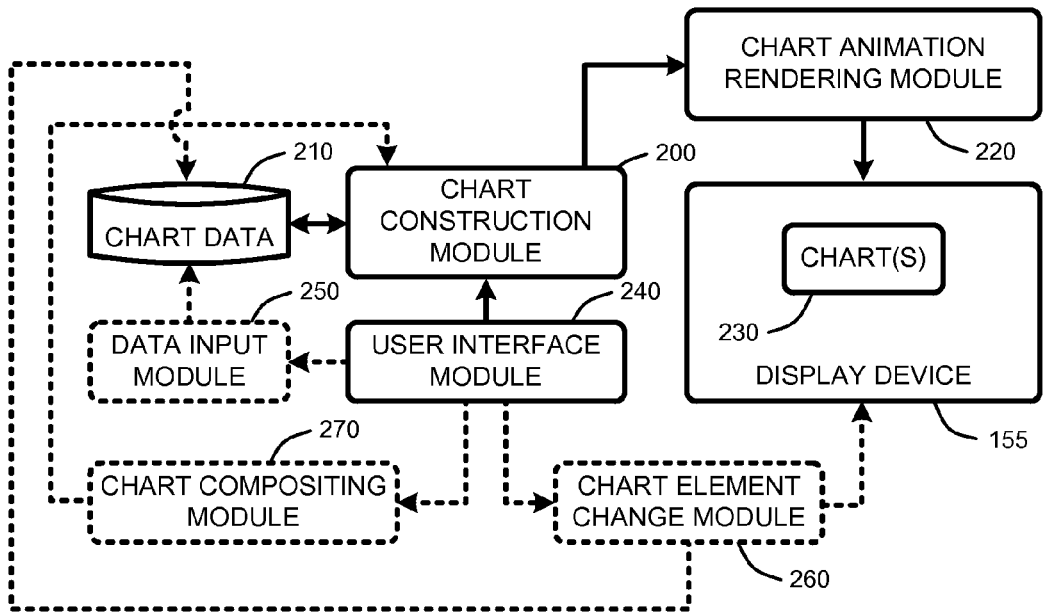
FIG. 2 illustrates an exemplary architectural system diagram showing exemplary program modules for implementing various embodiments of the Charting Animator, as described herein.

2.2 System Operational Overview:

The processes summarized above are further illustrated by the general system diagram of FIG. 2. In particular, the system diagram of FIG. 2 illustrates the interrelationships between program modules for implementing the Charting Animator, as described herein. It should be noted that any boxes and interconnections between boxes that are represented by broken or dashed lines in FIG. 2 represent alternate embodiments of the Charting Animator described herein, and that any or all of these alternate embodiments, as described below, may be used in combination with other alternate embodiments that are described throughout this document.

In general, as illustrated by FIG. 2, the Charting Animator generally begins operation by using a chart construction module 200 to define parameters used to construct one or more charts (e.g., Pie Charts, Bar Charts, Line Charts, Area Charts, Plateau Charts, etc.) using one or more sets of chart data 210. The chart construction module 200 then provides these parameters to a chart animation rendering module 220 which renders the chart(s) 230 on the display device 155.

Once the chart(s) 230 have been rendered on the display device 155 changes to the rendered chart(s) are enabled using any of several embodiments. For example, in one embodiment, a user interface module 240 is used to modify one or more of data elements comprising the chart data 210 via a data input module 250. Modifications to these data elements include changing the value of one or more of the data elements, adding one or more data elements, and deleting one or more data elements. In general, these data elements are maintained in a conventional computer readable format, such as, for example, in a list, table, database, etc. Consequently, direct modifications to the data elements by using a user interface to change the data elements via the data input module 250 is accomplished using conventional techniques.

As soon as any data elements have been modified, the chart construction module 200 immediately determines new chart parameters corresponding to the modified data elements, and passes those chart parameters to the chart animation rendering module 220. At this point, the chart animation rendering module 220 then morphs the existing charts(s) 230 into new chart(s) 230 using a dynamic animation that smoothly transitions from the existing chart(s) to the new chart(s) on the display device 155.

In another embodiment, changes to the rendered chart(s) 230 are enabled by directly modifying one or more elements of the chart(s), such as, for example, resizing the height of one or more bars on a Bar Chart, or changing the size of a pie slice in a Pie Chart. In various embodiments, direct modification of the elements of the chart(s) is accomplished via the user interface module 240 which allows the user to select one or more individual elements of one or more charts 230 using a graphical user interface provided via a chart element change module 260. This graphical user interface provides a graphical interface to chart(s) 230 being rendered on the display device 155 for resizing, moving, sorting, or deleting one or more of those chart elements. Similarly, chart elements can also be added to one or more of the chart(s) 230 via the graphical user interface provided by the chart element change module 260.

Clearly, there are a number of conventional techniques for providing user interaction with graphical elements being rendered on a display device, including, for example, the use of keyboard controls, mice or other pointing devices, the use of a touch screen, voice commands, etc. While such techniques are generally well known in the art, they have not previously been applied to conventional charting systems. The Charting Animator is capable of operating with any such techniques. However, rather than describe each such technique, the following discussion will simply describe one example for purposes of explanation.

For example, in one embodiment, resizing, moving, sorting, or deleting elements in the chart(s) 230 is accomplished using conventional drag and drop-type computer interaction with the displayed charts. For example, in one embodiment, resizing a bar in a Bar Chart is accomplished by selecting one corner or edge of the bar with a pointing device, then dragging that edge or corner to a desired position corresponding to a desired size for the bar. Similarly, in a related embodiment, sorting of elements in one or more chart(s) 230 is accomplished by simply grabbing one or more chart elements using a pointing device, then dragging those elements to whatever new position within the chart is desired. Similarly, in another embodiment, adding elements to one or more chart(s) 230 is accomplished by using a pointing device to drag an outline of the desired element (having a desired size or magnitude) onto the chart(s). A new element having the desired size or magnitude is then automatically added to the chart as described in further detail below.

In particular, as soon as any chart elements have been modified (by resizing, moving, sorting, deleting, adding, etc.), the chart element change module 260 then automatically modifies the corresponding data elements of the chart data 210 (or adds new values to the chart data) to fit changes made to the chart elements. For example, if a bar in a Bar Chart originally had a value of "10," then that bar was resized via the chart element change module 260 to show a value of "5" on the display device 155, then the chart element change module will change the value of the corresponding data element to "5" in the chart data 210.

In addition, the depending upon the chart(s) being displayed, many of the chart elements are often interdependent. Consequently, changes to one data element (either via the data input module 250, or via the chart element change module 260) used to construct the chart will often have an effect either on other data values, or on the displayed chart(s) 230. For example, if a pie slice in a Pie Chart is deleted or resized, or the underlying data value is changed, the other slices in the Pie Chart must be resized so that the Pie Chart retains a full pie shape. Therefore, whenever a change to data elements of the chart data 210 occurs (by any mechanism described herein), the chart construction module 200 immediately determines new chart parameters corresponding to the modified data elements, and passes those chart parameters to the chart animation rendering module 220. At this point, the chart animation rendering module 220 then morphs the existing charts(s) 230 into new chart(s) 230 using a dynamic animation that smoothly transitions from the existing chart(s) to the new chart(s) on the display device 155.

Finally, in yet another embodiment, a chart compositing module 270 is accessed via the user interface module 240 for creating a composite chart from two or more existing charts 230. In general, the user can use the chart compositing module 270 to specify (or select from a predefined list) some mathematical relationship between two or more existing charts 230. This mathematical relationship is then used to construct a composite chart by passing composite chart parameters to the chart construction module which in turn passes those parameters to the chart animation rendering module which acts to render the composite chart on the display device as an animation that morphs the existing charts into the composite chart. Note that composite charts are discussed in greater detail below in Section 3.4.

3.0 Operational Details of the Charting Animator:

The above-described program modules are employed for implementing the Charting Animator described herein. As summarized above, this Charting Animator provides a computer-based charting/graphing system for rendering dynamic animations of chart displays. The following sections provide a detailed discussion of the operation of the Charting Animator, and of exemplary methods for implementing the program modules described in Section 2. In particular, the following paragraphs describe chart data modifications; chart element selection and modification; animations and techniques for morphing chart element size and shape; and composite charts.

3.1 Chart Data Modification:

In general, each chart is defined based on one or more sets of underlying data elements. For example, a simple 2D Bar Chart may include data elements representing a magnitude for each of a plurality of bars to be displayed in the Bar Chart. Clearly, the underlying data elements of particular charts may differ depending upon the chart type. However, as with any conventional charting system, the basic idea is that each chart includes one or more sets of data elements that are used to define the chart parameters used to render those charts (e.g., x-y coordinates of a data point, magnitude of a data point, etc.). Note also that that the extents of one or more of the axes of any displayed chart can also be changed in the same manner as any underlying data element. The result here is that all chart elements will be scaled to fit the new extents of the chart axes without changing the corresponding data elements of those chart elements.

The Charting Animator provides several techniques for modifying one or more of the data elements of a displayed chart. For example, in one embodiment, data elements are manually changed by the user via a user interface which provides a mechanism for directly editing that data. This is how most conventional charting systems provide for modification of data elements.

Alternately, in another embodiment, the Charting Animator automatically modifies data elements to correspond to changes made to the graphical elements of a displayed chart. For example, as described in further detail in Section 3.2, each individual graphical element of a chart, such as a bar in a Bar Chart, for example, is user selectable and can be directly modified (moved, resized, deleted, combined, etc.) via the user interface.

Whenever any chart element is modified, the underlying data elements are automatically changed to reflect the modification to the corresponding element. For example, if a point on a Line Chart is moved in any direction in response to user interaction with that point, the coordinates of that point are automatically changed in the underlying data element to reflect the new position of that point in the Line Chart. Similarly, if the height of a bar in a Bar Chart is increased, the corresponding data element is also automatically increased by the Charting Animator.

In other words, in various embodiments, the Charting Animator provides a two-way one-to-one correspondence between the data elements and the graphical representation of chart elements, such that a change to one is immediately reflected in the other. Further, this correspondence includes related data elements such that any data element that is dependent upon another data element is automatically changed to reflect changes in the related data element. A simple example is a case where a first data element is defined as being equal to twice a second data element. Whenever the second data element is changed, either via direct manipulation of the data, or via some modification of the corresponding chart element, the first data element will be automatically changed to maintain the defined relationship between the first and second data elements.

In addition, in the case where a chart element is added to a chart, as described in Section 3.2, a corresponding data element, or set of data elements, depending upon the type of chart element being added, is automatically created by the Charting Animator.

In summary, data elements are changed or created in one of four ways: 1) direct manipulation of a data element via the user interface; 2) as an automatic response to user manipulation of a corresponding chart element; 3) as an automatic response to maintain a predefined relationship to another data element that is changed either via the user interface or in response to a change of the corresponding chart element; and 4) as an automatic response to the addition of a chart element to a chart.

3.2 Chart Element Selection and Modification:

As noted above, in various embodiments, some or all chart elements (points, lines, bars, pie slices, etc.) are selectable, either individually or in groups or two or more elements. Similarly, chart elements can be selected in a group by selecting entire rows and/or columns of chart elements, depending upon the chart type. In any case, selection of these chart elements is achieved via a graphical user interface using either a pointing device such as a mouse, trackball, touch screen, etc., or a keyboard, or any desired combination of pointing device and keyboard. Selection of objects in this manner using a graphical user interface (or via selection from a menu listing selectable objects) is a concept that is well known to those skilled in the art, and will not be described in detail herein.

In general, once one or more chart elements are selected, they are treated as a type of dynamic graphical object, and the Charting Animator provides the user with the capability to move, resize, delete, or combine (e.g., stacking bars in a Bar Chart, combining pie slices in a Pie Chart, etc.) those objects via the user interface.

In particular, moving chart elements is accomplished using a drag and drop type operation. Resizing chart elements is accomplished by grabbing a control handle (typically an edge, corner, or point of the chart element) using a pointing device and/or keyboard, then dragging that control handle to some desired position to resize the chart element. Deleting chart elements is accomplished by simply selecting any chart elements to be deleted, then either pressing a delete button, or selecting a delete option via a context sensitive popup menu, or the like.

In one embodiment, chart elements can be moved within a chart to any location that actually fits the context of the chart. This is interpreted as a manual sort operation. In this respect, the Charting Animator will prevent the user from moving chart elements to locations within a chart that would not be allowed in creating the chart. A simple example would be to prevent the user from moving a point in a Line Chart to a position that would create a discontinuity in a continuous function. An example of a permissible move is to allow the user to manually move either a single chart element, or one or more entire rows of chart elements from one place to another. For example, in a 3D Bar Chart, the user can move one or more bars to any desired row/column, including a new row/column (which would expand the extents of the original 3D Bar Chart). Again, the Charting Animator will decide whether the user initiated move is allowed, and will prevent the move, if necessary.

Combining chart elements is accomplished in a manner similar to moving chart elements. For example, in one embodiment, chart elements are combined by using a drag and drop type operation to drop one chart element onto another chart element. These chart elements are then automatically combined. However, in one embodiment, the Charting Animator will query the user before combining chart elements to ensure that that the user intended a combine operation rather than a move operation.

In one embodiment, the manual sort move operation is distinguished from the combining move operation by the shift key on the keyboard (or any other desired key or mouse button)—for example, in a tested embodiment, holding down the shift key indicates a manual sort move. In another embodiment, the manual sort move operation is distinguished from the combining move operation based on where the chart element is dropped (i.e., the drop target)—if the drop target is another chart element, it is interpreted as a combining move; if the drop target is between chart elements, it is interpreted as a manual sort move. Further, different visual feedback is provided while dragging chart elements to indicate to the user which operation will be done on drop.

Adding new chart elements to a chart is accomplished by either drawing a new chart element on the chart, or by selecting a chart element from a menu of chart elements, then dragging that selected chart element to the desired position on the chart (like moving a chart element) then sizing that chart element to the desired size. As noted above in Section 3.1, data elements corresponding to newly added chart elements are automatically created as soon as the chart element is added by the user.

In making any of the above described modifications to chart elements (moving, resizing, deleting, combining, or adding), the accuracy of the display device, pointing device, and/or keyboard may become an issue, depending upon what changes are being made to the chart elements, and on the scale being used to render the chart. Consequently, in one embodiment, as modifications (such as resizing, for example) are being made to a chart element, a numerical readout of the values of data elements that will be created or changed is displayed while the user is making those modifications to the chart element. This embodiment is useful for ensuring that the modified element has whatever values are desired by the user. Further, once the chart element has been modified, the user can directly edit the underlying data elements, as described in Section 3.1, if necessary to address further accuracy issues.

In summary, the Charting Animator allows user selection of one or more chart elements of any displayed chart to allow the user to move, resize, delete, combine, or add any of those chart elements. Changes to any chart element are automatically reflected in the underlying data elements and in any related or dependent data elements.

3.3 Animations:

In general, as described above, the Charting Animator provides graphical displays of animated transitions that morph one chart into another whenever any of the underlying data elements defining any chart element are changed. As described above in Sections 3.1 and 3.2, changes to the underlying data elements occur in any of several ways, including, for example, direct user editing or modification of those data elements, as an automatic response to user modification of a corresponding chart element, or as an automatic response to maintain a predefined relationship to other data elements that are modified. Further, animations take one of several different forms, depending upon the change being made or requested by the user.

For example, in one embodiment, the chart type of the displayed chart is maintained when a user changes either any data elements of the chart or any chart elements of the chart. In this case, the animation will be generally limited to simply rendering animated morphing to resize or reposition any chart elements affected by user's changes.

In another embodiment, the chart type of the displayed chart is changed to another chart type, either in the same chart family, or in a different chart family (e.g., changing a pie chart to a bar chart). In this case, the underlying data elements are not changed by user action. Instead, the user simply selects a new chart type from a menu of available chart types and/or families. The displayed chart is then morphed into the newly selected chart type. For example, the same data can be used to render both bars in a Bar Chart or pie slices in a Pie Chart.

For example, in a tested embodiment, an animation for morphing a 2D Bar Chart into a 3D Bar Chart uses an animation where the row of bars (i.e., the x-axis, assuming vertical bars) from the 2D chart is the only row on an otherwise empty 3D floor. Then, in continuing the transition to the 3D chart, new rows (representing additional sets of data) "grow" up from the floor as part of the transition animation. Conversely, when transitioning from a 3D Bar Chart to a 2D Bar Chart, the user will select a row to focus on before the transition. All other rows will then drop into the floor and disappear. Then the remaining row will transition to a 2D bar chart. Clearly, these simple examples describe one way of many ways in which such transitions can be animated by the Charting Animator. As such, these examples are not intended to limit the type, scope, or order of transition effects, and are intended for purposes of explanation only.

As with other transition animations, the general idea is to present the user with a smooth transition from the displayed chart type to the selected chart type. Therefore, geometric shapes are morphed, as needed, along with the shape of the chart itself, to create the newly selected chart. Further, since many chart elements may need to be changed, multiple animations are either chained together in a sequence, or rendered in parallel to provide a smoother transition from the original chart to the new chart.

In addition to the basic animations describe above, in various embodiments, the Charting Animator provides the capability to rotate charts in multiple dimensions as another animation, and to allow the user to manually rotate 3D charts to a desired viewpoint. The capability to rotate charts is also useful for chart type changes that include transitions to a higher or lower dimensionality (e.g., transitioning from a 2D Bar Chart to a 3D Bar Chart). For example, when transitioning from a 2D Bar Chart to a 3D Bar Chart, the primary animation is an animated movement from a virtual camera viewpoint to a different view point (e.g., a movement from a front view of the 2D chart to a perspective view of the 3D chart). In addition, since the flat bars of the 2D Bar Chart in this example will appear to be three-dimensional in the new 3D Bar Chart, there is an additional animation that extrudes each chart element from a 2D object to a 3D object. In various embodiments, this extrusion animation runs either in series or in parallel with the animation of the view point change.

Clearly, when animating the transition from one chart type to another, multiple chart elements will need to be morphed. While each chart element can be morphed in a serial animation, it has been observed that morphing all of the changes to chart elements in parallel animations provides the user with a better view of how the chart is changing from one chart type to another. As noted above, the length of an animation can be as long as desired. However, if it is too long, the user may have the perception that the overall system is too slow. Note that transition animations on the order of about one second in length worked well in a tested embodiment.

3.3.1 Chart Element Shape and Size Transitions:

In general, the Charting Animator has the ability to morph chart elements of one shape into chart elements of another shape, such as, for example, morphing to or from a rectangle to a line segment, area segment, or pie slice. This morphing is generally accomplished by moving existing points of the various chart elements to create the new shapes, then rendering intermediate shapes to create the animated transition. Further, in addition to moving points to define a new shape, the Charting Animator introduces new points as needed. For example, a pie slice requires many more points than a rectangular bar of a Bar Chart; so, when transitioning from a bar to a pie slice, more points are added—and when transitioning away from a pie slice, those extra points are eliminated.

Changing the shape of chart elements from one shape to another, such as, for example, changing a rectangular bar of a Bar Chart to a polygon of an Area Chart, or changing a rectangular bar of a Bar Chart to a pie slice of a Pie Chart is accomplished by smoothly morphing the chart element from the original shape to the new shape to provide an animated transition between the shapes. This morphing can be accomplished using any of a number of morphing techniques.

Figure 3:
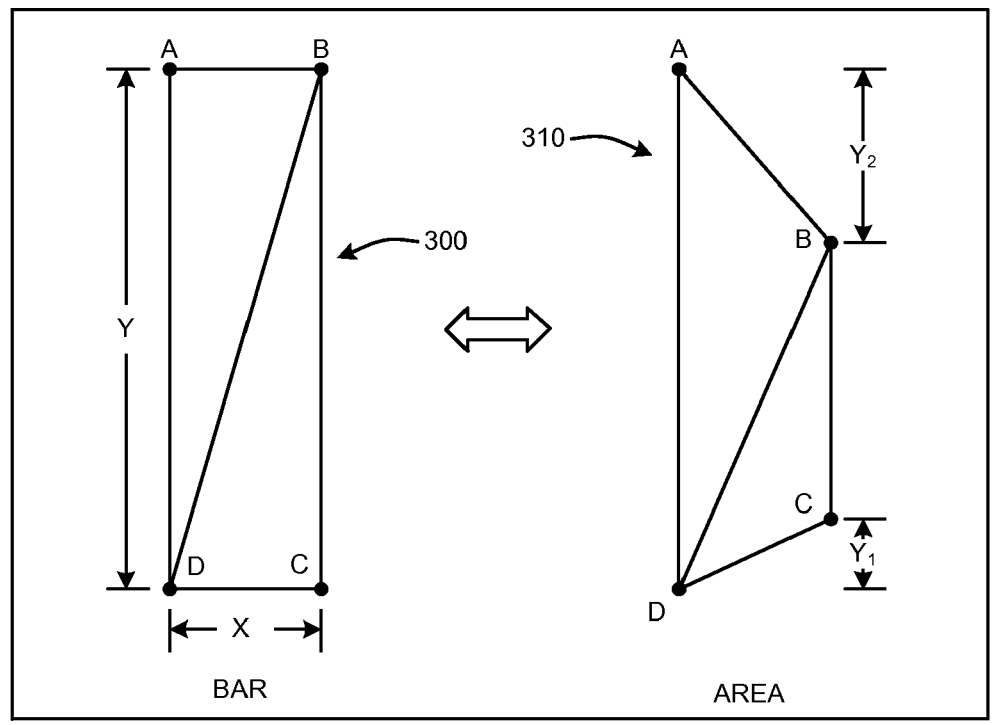
FIG. 3 illustrates an exemplary method for animating graphical transitions between a Bar Chart element and an Area Chart element for enabling various chart type and chart family morphing embodiments of the Charting Animator, as described herein.

For example, in a tested embodiment of the Charting Animator, as illustrated by FIG. 3, a rectangular bar of a Bar Chart is morphed into a polygon of an Area Chart. Note that this example is not intended to limit the way in which shapes are morphed, and is provided only as a simple illustration of shape morphing techniques that may be utilized by the Charting Animator.

In particular, as illustrated by FIG. 3, a rectangle 300 defined by corner points {A, B, C, D} is changed to polygon 310 by translating point B by offset $Y_2$, and translating point C by offset $Y_2$. Clearly, any of the four points of rectangle 300 can be translated in either the X or Y direction to provide the desired shape. Similarly, translating some or all of the points, depending upon the shape, is used for scaling the shape. For example, translating two or more of points A, B and C towards (or away from) point D can be used to scale the size of rectangle 300 either up or down. Further, any one of the four points of rectangle 300 can be collapsed into another of those points to create a triangle from the rectangle 300. In any case, once the points of the new shape have been determined, the animation from the original shape to the new shape is created by simply rendering a sequence of intermediate images in steps as small as one pixel for each point, over some period of time.

Figure 4:
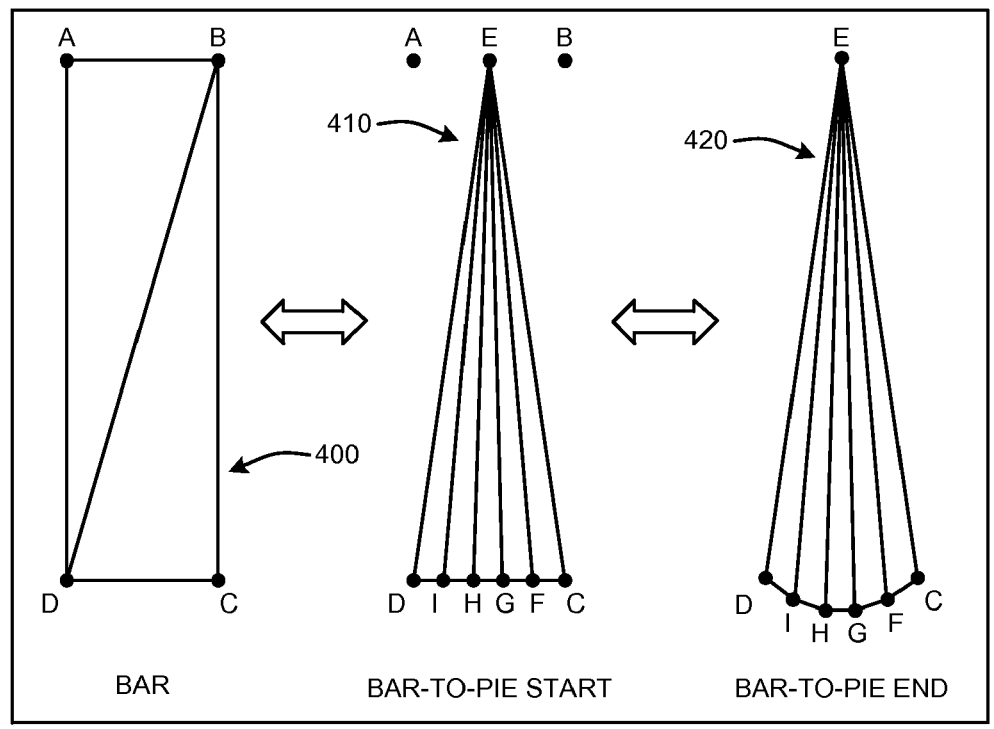
FIG. 4 illustrates an exemplary method for animating graphical transitions between a Bar Chart element and a Pie Chart element for enabling various chart type and chart family morphing embodiments of the Charting Animator, as described herein.

FIG. 4 provides an example of one way in which a rectangular bar of a Bar Chart is morphed into a pie slice of a Pie Chart. Again, this example is not intended to limit the way in which shapes are morphed, and is provided only as a simple illustration of shape morphing techniques that may be utilized by the Charting Animator.

In particular, as illustrated by FIG. 4, a rectangle 400 defined by corner points {A, B, C, D} is changed to a pie slice 420 via at least one intermediate image step 410. For example, when transitioning from the rectangle 400 to the pie slice 420, points A and B in the rectangle 300 are moved towards new point E in the intermediate shape 410. The result is the triangular shape 410. At the same time, the line between points C and D is divided into a plurality of additional points, such as points {C, D, F, G, H, I} that will be used to provide the curved side of the pie slice 420. Specifically, each of these points {C, D, F, G, H, I} is translated to form an arc, with the end result being the pie slice 420. Note that as discussed above, these transitions can be animated either in series or in parallel to provide the desired effect. Translating each of these points, A through 1, in the shape sequence 400 through 420, in steps of at least one pixel, then rendering a set of corresponding intermediate shapes creates a smooth animation that morphs the rectangle 400 into the pie slice 420.

Figure 5:
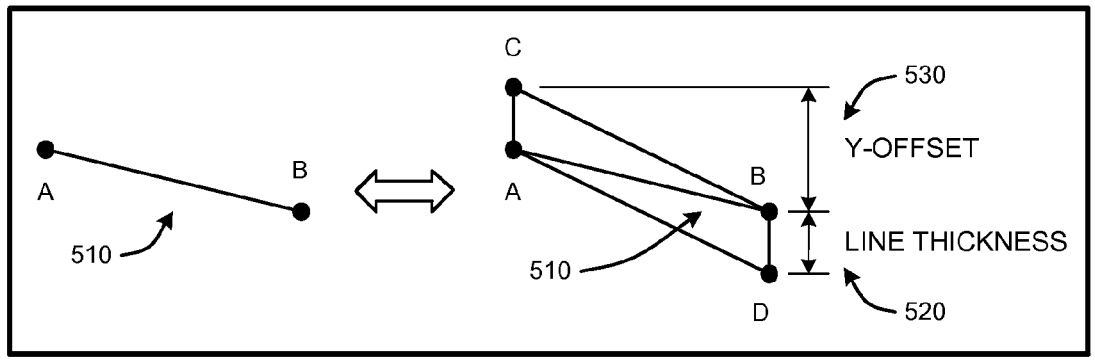
FIG. 5 illustrates an exemplary method for animating graphical transitions of line elements of a line chart for enabling various chart type and chart family morphing embodiments of the Charting Animator, as described herein.

Similar transitions are used to morph line thicknesses, or to transition from a line to a polygon. For example, as illustrated by FIG. 5, the thickness of a line 510 defined by points {A, B} can be changed by specifying some line thickness 520, then spreading points A and B into points C and D, respectively by the amount of the desired line thickness. Note that the same technique effectively creates a four-point polygon from a two point line. Further, including an offset value 530 allows for rotation of the resulting line or polygon.

In various embodiments, morphing of 3D chart elements is handled in a similar manner to the 2D morphing examples provided above. For example, a bar in a 2D Bar Chart has 4 points defining one face. In contrast, there are 6 faces for a bar in a 3D Bar Chart. However, even though there are more faces, the transition from the 2D to the 3D case (or from the 3D to the 2D case) is a simple matter of extruding (or collapsing points), and of translating or rotating points to a new viewpoint, to define a sequence of intermediate shapes, then rendering those shapes to create the animations for each chart element.

3.4 Composite Charts:

In addition to the features described above, in various embodiments, the Charting Animator also provides the capability to combine two or more charts to create a new chart a direct composition of one or more existing charts. One advantage of this embodiment is that two or more relatively simple charts can be combined to compose a more complex composite chart. In various embodiments, charts are combined using various techniques, including, for example, drag and drop type operations where one displayed chart is dropped onto another, or by selecting charts to be combined, along with a selection of a desired composite chart type from a menu, list, button, or the like. Further, in one embodiment, the Charting Animator provides the capability for the user to define and store custom composite chart types that may then be selected at a later time.

As noted above, in one embodiment, composition of charts is accomplished by selecting two or more charts to be overlaid on one another. With this type of composite, the charts can be, but are not necessarily related, via some mathematical relationship. In this case, the Charting Animator renders an animation that scales and aligns the charts to fit each other along one or more common axes to create the new composite chart.

In an alternate embodiment, two or more charts are combined by providing a user menu for selecting from a set of one or more predefined mathematical chart relationships, or allowing the user to define one or more new mathematical chart relationships. In either case, once the mathematical chart relationship has been either selected or defined by the user, the Charting Animator acts to render the two or more charts being combined along with the new composite chart. In general, since these charts are related via some mathematical relationship, they will share one or more common axes. As such, the Charting Animator renders all of the charts (the charts being combined and the new composite chart) together in a single display (that may include overlapping or adjacent charts, depending upon the composite chart type being rendered) relative to the common axes.

Furthermore, since all of the charts are related via the mathematical relationship in this embodiment, a plurality of the individual data elements of those charts will generally also have various mathematical relationships. Consequently, whenever any of the data elements or chart elements of any of the combined or composite charts is changed, the Charting Animator will automatically change any related data elements, as described above in Section 3.1, to maintain those various mathematical relationships. Then, in one embodiment, as soon as any of the underlying data elements are changed, the Charting Animator automatically renders an animation showing the changes to the corresponding chart elements in one or more of the combined or composite charts.

Figure 6:
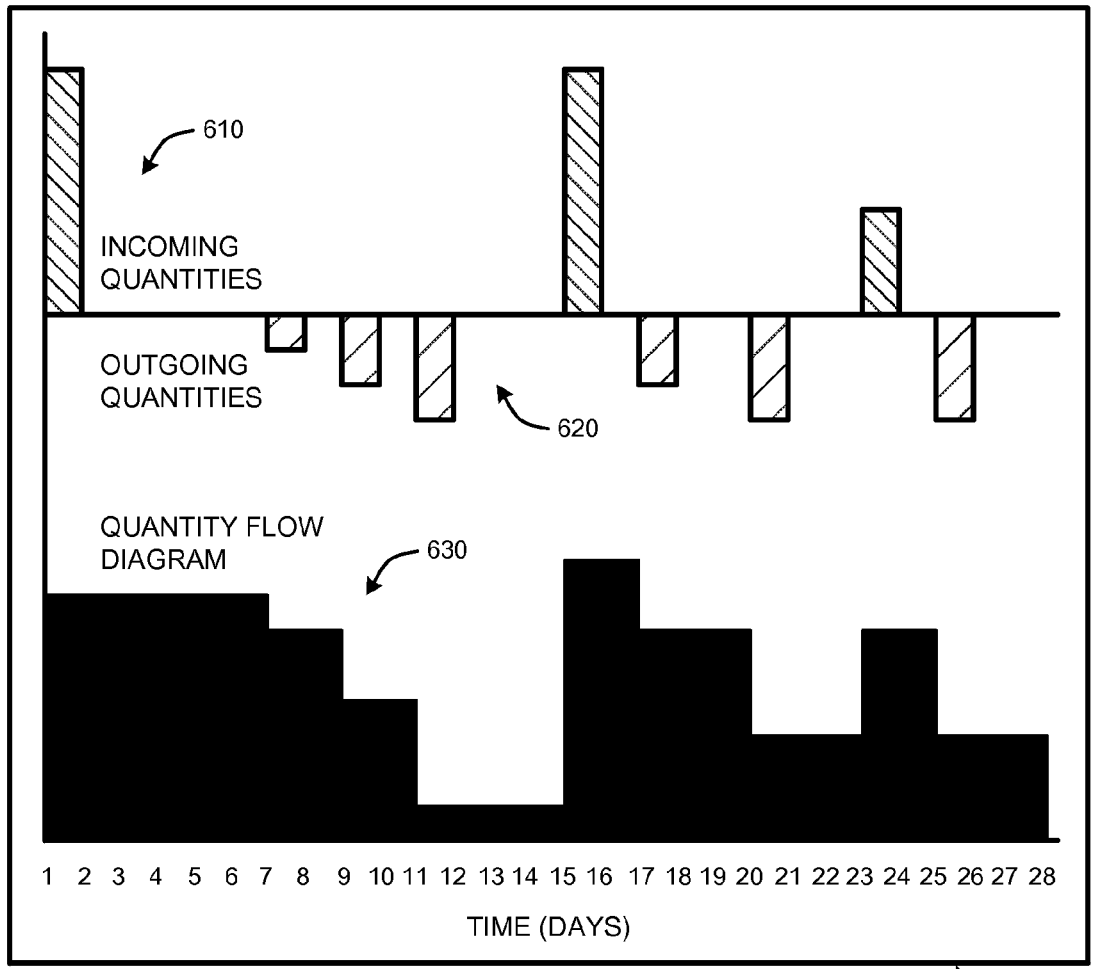
FIG. 6 Illustrates an example of a composite chart comprising a "Quantity Flow Diagram" produced by the Charting Animator, as described herein.

One example of a composite chart having a mathematical relationship to the charts used to construct the composite chart is termed a "Quantity Flow Diagram." An example of a Quantity Flow Diagram, as illustrated by FIG. 6. In general, the Quantity Flow Diagram is a composite chart constructed from two existing charts: 1) a 2D Bar Chart 610 that includes dates and amounts of incoming quantities; and 2) a 2D Bar Chart 620 that includes dates and amounts of outgoing quantities. Examples of incoming and outgoing quantities include cash flow and material (inventory) availability, to name only two such examples.

Given this example data set, the user will first select two 2D Bar Charts (610 and 620) and designate one as being subtracted from the other (i.e., the user will select or specify the mathematical relationship between the charts). The Charting Animator then constructs the Quantity Flow Diagram 630 as a composite chart that shows incoming quantities in the first 2D Bar Chart 610 (positive bars trending up from a common axis), the second 2D Bar Chart 620 below the first 2D Bar Chart 610 that shows the outgoing quantities (negative bars trending down from the common axis), and a Plateau Chart 630 below the first and second 2D Bar Charts showing the quantity flow (the difference of the two quantities over time).

Further, all of the elements of this three part composite chart are interrelated. Therefore, in one embodiment, changes made to any one or more chart elements of the composite chart 630, or to either of the two 2D Bar Charts (610 and 620), or to any of the underlying data elements, will be immediately reflected in all related data elements of those three charts, as described above, with those changes also being immediately rendered as an animation to any corresponding chart elements.

The foregoing description of the Charting Animator has been presented for the purposes of illustration and description. It is not intended to be exhaustive or to limit the invention to the precise forms disclosed. Many modifications and variations are possible in light of the above teaching. Further, it should be noted that any or all of the aforementioned alternate embodiments may be used in any combination desired to form additional hybrid embodiments of the Charting Animator. It is intended that the scope of the invention be limited not by this detailed description, but rather by the claims appended hereto.

What is claimed is:

1. A method for animating changes to charts, comprising steps for:
   receiving at least one data set comprising a plurality of data elements;
   automatically rendering a first chart having a user selected first chart type from data elements of the at least one data set;
   wherein the chart includes a plurality of chart elements that provide graphical representations of corresponding data elements,
   displaying the first chart on a display device;
   changing one or more of the data elements of the at least one data set; and
   rendering an animation on the display device that morphs the first chart into a second chart, wherein the second chart is rendered from the data elements of the at least one data set, including the one or more changed data elements.

2. The method of claim 1 wherein changing one or more of the data elements of the at least one data set further comprises steps for comprises directly editing one or more of the data elements via a graphical user interface.

3. The method of claim 1 wherein changing one or more of the data elements of the at least one data set further comprises steps for:
   using a graphical user interface to graphically change one or more of the chart elements; and
   wherein corresponding data elements are automatically changed to correspond to the changes to the one or more chart elements.

4. The method of claim 1 wherein changing one or more of the data elements of the at least one data set further comprises steps for:
   adding at least one new data element to the at least one data set; and
   wherein rendering the animation on the display device that morphs the first chart into the second chart comprises animating an addition of one or more new chart elements corresponding to the at least one new data element.

5. The method of claim 1 wherein changing one or more of the data elements of the at least one data set further comprises steps for:
   deleting at least one data element from the at least one data set; and
   wherein rendering the animation on the display device that morphs the first chart into the second chart comprises animating a deletion of one or more chart elements corresponding to the at least one deleted data element.

6. The method of claim 1 wherein changing one or more of the data elements of the at least one data set further comprises steps for:
   sorting one or more of the data elements; and
   wherein rendering the animation on the display device that morphs the first chart into the second chart comprises animating a graphical sort of the chart elements corresponding to the sorting of the data elements.

7. The method of claim 1 wherein the user selected first chart type is one of the data elements, and wherein changing one or more of the data elements of the at least one data set further comprises steps for:
   selecting a second chart type; and
   wherein rendering the animation on the display device that morphs the first chart into the second chart comprises morphing the first chart type into the second chart type.

8. A physical computer readable storage media having computer executable instructions stored thereon for rendering charts on a display device, comprising instructions for:
   entering a set of data elements;
   selecting a first chart type from a list of available chart types;
   rendering a first chart of the selected first chart type on a display device as a function of the set of data elements, said first chart being composed of a plurality of chart elements each chart element providing a graphical representation of one or more of the data values;
   modifying one or more of the data elements via a graphical user interface; and
   rendering an animated transition that morphs the first chart into a second chart, said second chart being rendered as a function of the set of data elements as changed by modifying one or more of the data elements.

9. The computer readable storage media of claim 8 wherein modifying one or more of the data elements comprises directly editing values of the one or more data elements via the graphical user interface.

10. The computer readable storage media of claim 8 wherein modifying one or more of the data elements comprises instructions for manually resizing one or more of the chart elements via the graphical user interface, and wherein any data values associated with a resized chart element are automatically changed to correspond to the resized chart element.

11. The computer readable storage media of claim 8 wherein modifying one or more of the data elements comprises instructions for manually moving one or more of the chart elements to a new position within the first chart via the graphical user interface, and wherein any data values associated with a moved chart element is automatically sorted to correspond to the new position of the moved chart element.

12. The computer readable storage media of claim 8 wherein modifying one or more of the data elements comprises instructions for manually resizing one or more of the chart elements via the graphical user interface, and wherein any data values associated with a resized chart element are automatically changed to correspond to the resized chart element.

13. The computer readable storage media of claim 8 wherein modifying one or more of the data elements comprises instructions for manually deleting one or more of the chart elements via the graphical user interface, and wherein any data values associated with a deleted chart element are automatically deleted from the set of data elements.

14. The computer readable storage media of claim 8 wherein modifying one or more of the data elements comprises instructions for manually adding one or more new chart elements via the graphical user interface, and wherein new data values corresponding to the new chart elements are automatically added to the set of data elements.

15. A system for rendering charts, comprising using a computing device for:
receiving a set of data elements, said data elements representing values for defining graphical elements of a chart;
providing a user interface for selecting a first chart type;
rendering a first chart of the selected chart type on a display device using the set of data elements to define each graphical element of the first chart;
changing one or more parameters of the first chart;
determining an appearance of a second chart based on the changed parameters of the first chart; and
rendering an animated transition on the display device that morphs the first chart into the appearance of the second chart over a predefined period of time.

16. The system of claim 15 wherein changing one or more parameters of the first chart comprises editing one or more of the data elements via the user interface.

17. The system of claim 15 wherein changing one or more parameters of the first chart comprises selecting a second chart type.

18. The system of claim 15 wherein changing one or more parameters of the first chart comprises resizing one or more of the graphical elements of the first chart by interacting with graphical elements of the first chart via the user interface, and wherein any data elements related to any resized graphical elements are automatically modified to correspond to the resized graphical elements.

19. The system of claim 15 wherein changing one or more parameters of the first chart comprises moving a row of graphical elements to a new row of the first chart, and wherein the set of data elements is automatically sorted to correspond to the new row of the moved graphical elements.

20. The system of claim 15 wherein changing one or more parameters of the first chart comprises combining one or more graphical elements of the first chart into a single composite graphical element, and wherein any data elements corresponding to the composite graphical element are combined in the set of data values.

\* \* \* \* \*